(12) United States Patent
Goudie et al.

(10) Patent No.: US 12,710,979 B2
(45) Date of Patent: Aug. 18, 2026

(54) SCHEDULING PROCESSING IN A RAY TRACING SYSTEM

(71) Applicant: Imagination Technologies Limited, Kings Langley (GB)

(72) Inventors: Alistair Goudie, Hertfordshire (GB); Panagiotis Velentzas, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 95 days.

(21) Appl. No.: 17/851,519

(22) Filed: Jun. 28, 2022

(65) Prior Publication Data

US 2023/0016927 A1 Jan. 19, 2023

(30) Foreign Application Priority Data

Jun. 29, 2021 (EP) .................................... 21386040

(51) Int. Cl.
*G06F 9/48* (2006.01)
*G06T 15/00* (2011.01)
*G06T 15/06* (2011.01)

(52) U.S. Cl.
CPC .......... *G06F 9/4881* (2013.01); *G06T 15/005* (2013.01); *G06T 15/06* (2013.01)

(58) Field of Classification Search
CPC ...... G06F 9/4881; G06T 15/005; G06T 15/06
USPC .......................................................... 345/426
See application file for complete search history.

(56) References Cited

U.S. PATENT DOCUMENTS 9,607,426 B1 * 3/2017 Peterson ............... G06T 15/005
2013/0222402 A1 * 8/2013 Peterson ................... G06F 9/52 345/520
2014/0101278 A1 * 4/2014 Raman ................ G06F 12/0862 709/213
2016/0071312 A1 * 3/2016 Laine ...................... G06T 15/08 345/419
2020/0043218 A1 2/2020 Vaidyanathan et al.
2020/0089528 A1 3/2020 Gutierrez et al.
2021/0216368 A1 * 7/2021 Gutierrez ............. G06F 9/4843

OTHER PUBLICATIONS

Davis et al., "A review of priority assignment in real-time systems," Journal of Systems Architecture, vol. 65, Apr. 14, 2016, pp. 64-82, XP029526977.
Yagel et al., "Priority-driven ray tracing," Journal of Visualization and Computer Animation, vol. 8, No. 1, Jan. 1, 1997, pp. 17-32, XP002467277.

* cited by examiner

*Primary Examiner* — Jin Ge
(74) *Attorney, Agent, or Firm* — Potomac Law Group, PLLC; Vincent M DeLuca

(57) ABSTRACT

A method of scheduling processing in a ray tracing system gathers child rays into a child task, assigns priority to the child task on the basis that one or more child rays of the child task are derived from a task to which priority has been assigned, and schedules the child task for processing in preference to one or more other tasks to be scheduled to which priority has not been assigned.

18 Claims, 4 Drawing Sheets

SCHEDULING PROCESSING IN A RAY TRACING SYSTEM

FIELD

The present disclosure is directed to scheduling processing in a ray tracing system.

BACKGROUND

Ray tracing is a computational rendering technique for rendering an image of a scene by tracing paths of light ("rays") through the scene, e.g. from a viewpoint from which the image of the scene is being rendered. A ray can be modelled as originating from the viewpoint and passing through a sample position of a rendering space into the scene. Each pixel of the image being rendered may correspond to one or more sample positions of the rendering space. A ray that originates from the viewpoint is referred to as a "primary ray".

FIG. 1 shows how rays are processed in a ray tracing system. In step S102, a ray generation shader is executed to launch one or more primary rays, and to then process the launched primary ray(s). A "shader" (which may be referred to as a "shader program") is a software module comprising one or more computer-readable instructions which can be executed on a processing unit. The functionality performed by a shader is flexible and is defined by a programmer who writes the code of the shader.

As a ray traverses the scene it may intersect one or more objects within the scene. The interaction between a ray and an object it intersects can be modelled to create realistic visual effects. For example, the first shader to be executed which generates a primary ray (a "ray generation shader") may include an instruction (a "TraceRay" instruction) which causes an intersection testing process to be performed, in step S104, to thereby find one or more intersections of the ray with one or more objects in the scene. The intersection testing process could be performed in hardware or software, but is typically performed in hardware (e.g. using fixed-function circuitry) because efficiency of processing is typically considered to be more important than flexibility in functionality for the intersection testing process.

In response to finding an intersection of a ray with an object, in step S106, a shader is executed in respect of the intersection. The shader that is executed (or "run") in step S106 may be a closest hit shader, a miss shader, an intersection shader or an any hit shader, which are defined in the Vulkan and DirectX ray tracing specifications. A programmer writes the shader programs to define how the system reacts to the intersections. The shader that is executed in step S106 may include a TraceRay instruction, which causes one or more further rays (referred to as "secondary rays") to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. Therefore, the method can pass from step S106 back to step S104 as shown by the dashed line in FIG. 1 denoted "TraceRay". When an intersection is found for a secondary ray (in step S104) then another shader can be executed (in step S106). In this way, the method recursively passes between steps S106 and S104 when TraceRay instructions are included in the shaders that are executed in step S106.

A ray is described by data defining the ray origin, ray direction, a maximum culling distance ("Tmax") and a minimum culling distance ("Tmin"). A ray is accompanied by a user defined payload that is modifiable as the ray interacts with geometry in the scene and is visible to the caller of a TraceRay instruction. Furthermore, according to the Vulkan and DirectX ray tracing specifications, the shaders that are executed in step S106 may include one or more "CallShader" instructions, which cause another shader to be executed. Therefore, one shader can call another shader so the method can recursively pass between different shaders as shown by the dashed line in FIG. 1 denoted "CallShader".

When all of the shaders for a primary ray have completed then an output for the primary ray is provided. This output may be a rendered value, e.g. pixel colour, which is to be used for the pixel corresponding to the primary ray. In this way, rendered values representing the pixels of the image of the scene are determined.

Vulkan and Direct X are application programming interfaces (APIs) for 3D graphics processing, which have ray tracing extensions defining how programmers can use ray tracing systems to render images of 3D scenes. These APIs have opened up the concept of shader recursion for use in ray tracing systems. As described above, shader recursion occurs when an instruction implemented within a shader causes one or more other shaders to be invoked. The invoked shader (which may be referred to as a "child" shader) is treated like a function call in which control will eventually return back to the invoking shader (which may be referred to as a "parent" shader). Payload data can be passed from a parent shader to a child shader, and the child shader can communicate back to the parent shader by updating the payload data.

When shader recursion is used, some intermediate data for the parent shader is maintained, so the parent shader can continue its execution when the child shader has completed its execution. Many rays may be processed in parallel in a ray tracing system. Furthermore, in order to achieve realistic rendering results, ray tracing systems can allow large recursion depths, e.g. up to a maximum recursion depth of 31. As such, the lifetime of the intermediate data fora parent shader may be very long, and at any given time there may be many shaders for which intermediate data is being maintained.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the present invention there is provided a method of scheduling processing in a ray tracing system, the method comprising: gathering child rays into a child task; assigning priority to the child task on the basis that one or more child rays of the child task are derived from a task to which priority has been assigned; and scheduling the child task for processing in preference to one or more other tasks to be scheduled to which priority has not been assigned.

The method may further comprise assigning priority to a parent task; and processing the parent task so as to emit at least one child ray; wherein said gathering child rays into a child task comprises gathering one or more child rays emitted by the parent task into the child task.

The method may further comprise scheduling the parent task for processing in preference to one or more other tasks to be scheduled to which priority has not been assigned.

The parent task may be a primary task.

One or more parent rays of the parent task may be derived from a primary task to which priority has been assigned.

A plurality of primary tasks may be active in the ray tracing system at a particular time.

The method may further comprise assigning priority to one or more primary tasks of the plurality of primary tasks in dependence on the relative age of each of the primary tasks.

The method may further comprise assigning priority to multiple primary tasks of the plurality of primary tasks, wherein the number of primary tasks that, at the particular time, are active in the ray tracing system to which priority can be assigned is limited to a predefined number.

A primary task may be a task that does not itself have a parent task. A primary task may be a task implementing a ray generation shader so as to launch one or more primary rays.

Assigning priority to a primary task may comprise allocating a priority flag to that primary task.

The method may further comprise assigning a secondary priority to one or more child rays of the child task, wherein the one or more child rays are derived from tasks to which priority has not been assigned.

The method may further comprise: processing the child task so as to emit one or more grandchild rays; gathering one or more grandchild rays emitted by the child task in respect of child rays having been assigned the secondary priority into a grandchild task, none of the rays gathered into the grandchild task being derived from a primary task to which priority has been assigned; assigning a secondary priority to the grandchild task; and scheduling the grandchild task for processing in preference to one or more other tasks to be scheduled to which priority has not been assigned.

Scheduling the grandchild task for processing may comprise scheduling one or more other tasks to which priority has been assigned in advance of the grandchild task to which secondary priority has been assigned.

The method may further comprise, prior to scheduling a task to which priority has not been assigned, delaying for a period of time without scheduling said task.

The method may further comprise if a task to which priority has been assigned becomes available for scheduling during the period of time, scheduling the task to which priority has been assigned in preference to the task to which priority has not been assigned.

The method may further comprise if a task to which secondary priority has been assigned becomes available for scheduling during the period of time, scheduling the task to which secondary priority has been assigned in preference to the task to which priority has not been assigned.

The period of time may be adaptive in dependence on the amount of memory available to the ray tracing system for storage of intermediate data relating to tasks present in the ray tracing system.

The method may further comprise: providing a first queue for tasks to which priority has been assigned and a second queue for tasks to which priority has not been assigned; and scheduling tasks for processing from the second queue only when no tasks are present in the first queue.

The method may further comprise: providing a third queue for tasks to which secondary priority has been assigned; and scheduling tasks for processing from the second queue only when no tasks are present in the first queue and no tasks are present in the third queue, and scheduling tasks for processing from the third queue only when no tasks are present in the first queue.

Each task may comprise a plurality of instances of a shader program corresponding to a respective plurality of rays for which the shader program is to be executed.

According to a second aspect of the present invention there is provided a ray tracing system configured to process rays, wherein the ray tracing system comprises task scheduling logic configured to: gather child rays into a child task; assign priority to the child task on the basis that one or more child rays of the child task are derived from a task to which priority has been assigned; and schedule the child task for processing in preference to one or more other tasks to be scheduled to which priority has not been assigned.

The ray tracing system may be embodied in hardware on an integrated circuit. There may be provided a method of manufacturing, at an integrated circuit manufacturing system, a ray tracing system. There may be provided an integrated circuit definition dataset that, when processed in an integrated circuit manufacturing system, configures the system to manufacture a ray tracing system. There may be provided a non-transitory computer readable storage medium having stored thereon a computer readable description of a ray tracing system that, when processed in an integrated circuit manufacturing system, causes the integrated circuit manufacturing system to manufacture an integrated circuit embodying a ray tracing system.

There may be provided an integrated circuit manufacturing system comprising: a non-transitory computer readable storage medium having stored thereon a computer readable description of the ray tracing system; a layout processing system configured to process the computer readable description so as to generate a circuit layout description of an integrated circuit embodying the ray tracing system; and an integrated circuit generation system configured to manufacture the ray tracing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
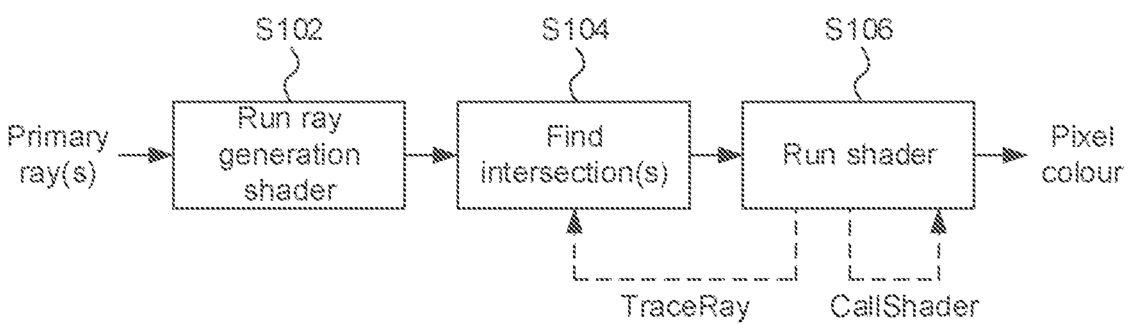
FIG. 1 shows a shows a method of recursively processing rays in a ray tracing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Figure 2:
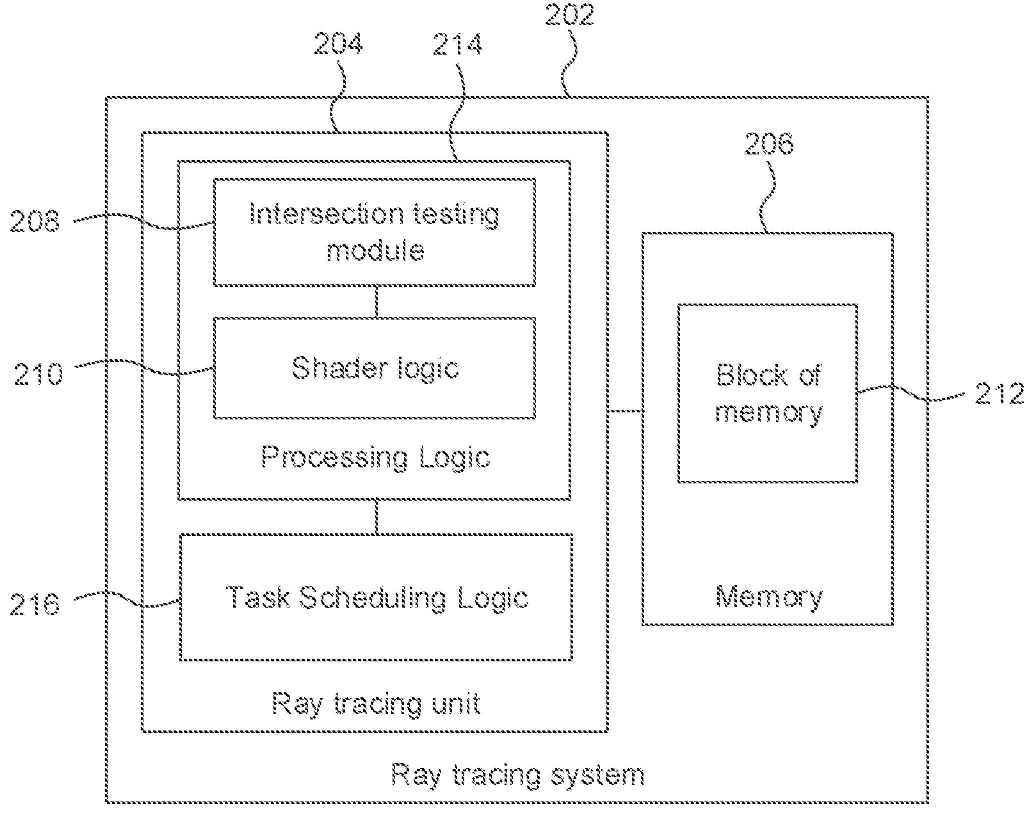
FIG. 2 shows a ray tracing system according to examples described herein.

FIG. 2 shows a ray tracing system 202 according to examples described herein. Ray tracing system 202 comprises a ray tracing unit 204 and a memory 206. The ray tracing unit 204 includes processing logic 214 that comprises intersection testing module 208 and shader logic 210. The ray tracing unit 204 also includes task scheduling logic 216, which will be described in further detail herein with reference to FIGS. 3 and 4.

Intersection testing module 208 is configured to perform intersection testing of rays with geometry. The geometry could be associated with nodes of an acceleration structure and may represent regions (e.g. bounding volumes such as axis-aligned bounding boxes (AABBs)) within the scene, or the geometry could be primitives, e.g. triangular primitives, representing surfaces of objects within the scene to be rendered. The intersection testing module 208 may be implemented in hardware, e.g. in fixed-function circuitry, so that it can perform the intersection tests efficiently (e.g. in terms of latency and power consumption).

Shader logic 210 is configured to execute computer code, e.g. instructions of shader programs (or other programs). Therefore, the functionality performed by the shader logic 210 is defined by the programs which are executed by the shader logic 210 rather than being defined in the hardware of the shader logic 210. The ray tracing unit 204 may comprise other components which are not shown in FIG. 2, e.g. a module for generating an acceleration structure to represent the objects within the scene.

Memory 206 may be a dynamic random access memory (DRAM) memory. Memory 206 may comprise a block of memory 212. The block of memory 212 may be implemented as a block of continuous memory that has been reserved for a particular purpose. Although only one block of memory is illustrated, the memory 206 may comprise multiple different blocks of memory, reserved for different purposes. The ray tracing unit 204 may be implemented on an integrated circuit. In an example, the ray tracing unit 204 may be implemented on a chip and the memory 206 may be physically located on the same chip as the ray tracing unit, and so may be referred to as an "on-chip memory". In another example, the ray tracing unit 204 may be implemented on a chip and the memory 206 may not be physically located on the same chip as the ray tracing unit, and so may be referred to as an "external memory" or an "off-chip memory". As described herein, memory 206 schematically shown in FIG. 2 may comprise multiple blocks of memory—in these examples, one or more of those blocks of memory may be physically located on the same chip as the ray tracing unit, and one or more other of those blocks of memory may not be physically located on the same chip as the ray tracing unit. The memory may also be referred to as "system memory" and it may be used to store data for other processing units in the system, e.g. a Central Processing Unit (CPU). Data passing between the ray tracing unit 204 and the memory 206 travels over a communications bus within the ray tracing system 202.

Shader recursion, as described in the background section above, can be performed by ray tracing system 202, such that each parent shader can invoke one or more child shaders. A parent shader invokes a child shader when the parent shader executes a shader recursion instruction. The term "shader recursion instruction" is used herein to refer to any instruction in a shader which invokes another shader. Examples of shader recursion instructions are: (i) "TraceRay" instructions which cause rays to be emitted and cause intersection testing to be performed for the emitted rays, wherein a shader will be executed on the basis of the results of the intersection testing for the emitted ray; and (ii) "CallShader" instructions which directly invoke another shader (with a callable shader type) to be executed without any ray traversal (i.e. intersection testing) being performed. In some implementations an instruction to invoke an "any-hit" shader may be a shader recursion instruction, e.g. the DirectX ray tracing specification calls these instructions "ReportHit" instructions, and the Vulkan ray tracing specification calls these instructions "OpReportIntersectionKHR" instructions. All of these types of shader recursion instructions result in the invocation of a child shader. When a shader recursion instruction is executed as part of a parent shader to thereby invoke a child shader, intermediate data for the parent shader is maintained, so that the parent shader can be resumed when the child shader has completed its processing.

In examples described herein a shader program is executed for a plurality of rays by executing a task, wherein the task comprises a plurality of instances of the shader program corresponding to a respective plurality of rays for which the shader program is executed. A task may be executed on a Single Instruction Multiple Data (SIMD) processing unit such that the instructions of the shader program are executed in parallel for each of the instances of the task. Therefore, as described herein, a "task" is a set of instances which are to be executed in parallel; and an "instance" is a collection of data on which a series of operations is to be performed. In examples described herein, the instances of a task correspond to respective rays for which the same series of operations (defined by a shader program) are to be performed. The number of instances comprised by a task may be limited. The limit on the number of instances in a task may be caused by a hardware restriction (e.g. a limit on how many instances can be processed in parallel on the available processing logic). In an example, a task may comprise up to a number of instances equal to a power of two—although a task may be partially packed and comprise less than that number of instances. For example, a typical task may comprise up to 128 (i.e. $2^7$) instances. In this example, if more than 128 rays are to be processed in accordance with the same shader program, then more than one task will be associated with that shader program. For example, if 300 rays are to be processed in accordance with the same shader program, then three tasks may be associated with that shader program (two of which could be fully packed, the third being partially packed).

When a shader recursion instruction is reached during the execution of a parent task (corresponding to a parent shader), intermediate data for the parent task is written to memory (e.g. block of memory 212) and the parent task is suspended (i.e. its execution is temporarily ended on the ray tracing unit). The intermediate data that is stored for a parent task may comprise: (i) state data, (ii) payload data, and (iii) task information.

The state data represents information about the state of the parent task at the point at which its execution is suspended. For example, the state data may include any data stored in temporary registers (which may be per-instance temporary registers or per-task temporary registers) which will need to be accessible when the task resumes. To give some examples, these temporary registers may store intersection indexes and/or barycentrics. As another example, if multiple rays are cast from an associated intersection to model some form of light scattering, whilst the shader is paused, some form of material properties may be held stored as state data for future ray casts associated with the single intersection, e.g. because it may be the case that only one ray is cast at a time. The material properties could, for example, be refractive indexes, opacity, surface normal.

The payload data is per-instance data relating to individual rays being processed. In particular, the payload data comprises application-defined payload objects for the rays. For example, each ray (i.e. each instance) can have an application defined ray payload. A child shader may be able to modify (i.e. update) the payload data provided by a parent shader. The size of a payload depends on the application (typically its in the order of three or four double words ("dwords"), e.g. to store a pixel colour which has three or four channels with a 32-bit value (e.g. in a floating point format) per channel, but could potentially be larger or smaller than this). The size of the payload data is not fixed.

The task information is intended to store information about which shader program to re-schedule, at what program offset to resume the program, and define which order the original rays were packed into the task. In other words, the task information for a parent task indicates how the execution of the parent task is to be resumed, e.g. specifying the program counter at which the parent shader program is to resume, and specifying information about the mapping between rays and instances of the task (e.g. using ray IDs).

It may be possible to store the intermediate data in on-chip resources (i.e. memory on the chip on which the ray tracing unit is implemented). That said, in these examples, the amount of this on-chip resource may need to be greater than that which is normally implemented in non-recursive ray tracing systems, or the performance of the ray tracing system would be expected to suffer. Therefore, at least some of the intermediate data (e.g. most or all of the intermediate data) may be stored in an off-chip memory. In particular, devices with limited processing resources (e.g. mobile devices) tend to have insufficient on-chip storage capability to store the intermediate data on-chip, so the intermediate data will tend to be stored in off-chip memory. Block of memory 212 may be implemented as a block of continuous memory that has been reserved for storing intermediate data for suspended tasks.

The parent task remains suspended whilst its child task(s) (corresponding to child shader(s)) and any further descendent tasks derived from that parent task (e.g. grandchild tasks, great-grandchild tasks etc.) are processed. Once its child tasks (and any further descendent tasks derived from that parent task) have completed processing, the intermediate data for a parent task can be read back from memory (e.g. block of memory 212), and the execution of the parent task can be resumed. When processing of the parent task is resumed the task scheduling logic (e.g. task scheduling logic 216) re-schedules the parent task to carry on with its execution from the point at which it was suspended.

The memory (e.g. block of memory 212) available for storing intermediate data relating to suspended tasks is finite. That is, there is a fixed amount of memory available for storing intermediate data relating to suspended tasks that cannot be exceeded. This means that the available memory can become saturated (e.g. fully occupied) with intermediate data relating to suspended tasks awaiting resumption of processing. As described herein, to complete the processing of a parent task so as to "release" the memory it is using for storing intermediate data, it is necessary to complete the processing of the recursive series of descendant tasks (e.g. child tasks, grandchild tasks, great-grandchild tasks etc) derived from that parent task. This often involves the descendant tasks executing shader recursion instructions, and themselves being suspended and writing intermediate data to memory whilst the invoked further generations of descendant tasks are processed. Thus, if the memory (e.g. block of memory 212) becomes saturated with intermediate data, it can be very difficult (if not impossible) to remedy this situation by continuing to process tasks as normal—because "releasing" the memory occupied by intermediate data for a task may first require the allocation of further memory to enable the processing of its descendant tasks to be completed. The processing of a parent task can fail if its descendant tasks are unable to access memory for storage of intermediate data.

Memory saturation can been addressed using "deadlock avoidance" approaches, in which one ray is scheduled for processing at a time when approaching memory saturation. The amount of memory required to store intermediate data for a single ray and any descendant rays in the recursive series necessary to complete the processing of that ray is small relative to the amount of memory required to store intermediate data for a task and any descendant tasks in the recursive series necessary to complete the processing of that task. Thus, deadlock avoidance approaches can be useful for "releasing" the memory individual primary rays and their descendant rays are using for storing intermediate data, so as to avoid memory saturation by gradually increasing the amount of available memory. However, deadlock avoidance approaches are highly detrimental to performance (e.g. severely reduce throughput and increase latency). Thus, an alternative approach to avoiding or remedying memory saturation is desirable.

According to the principles described herein, priority can be assigned to one or more primary tasks active in a ray tracing system. Said priority can be referred to herein as "primary priority". A primary task is a task that does not itself have a parent task. A primary task is a task implementing a ray generation shader so as to launch one or more primary rays. In some examples, a primary task is a task implementing a ray generation shader so as to launch a plurality of primary rays. A primary task may be described as being active in a ray tracing system if, for example, it is being executed (e.g. in processing logic 214), it is suspended awaiting resumption of execution (e.g. with intermediate data stored in memory 206), or it is awaiting scheduling for processing (e.g. in task scheduling logic 216). Priority can be assigned to a primary task based on the relative age of each of the primary tasks active in the ray tracing system at a particular time. For example, priority could be assigned to one or more primary tasks that have been active in the ray tracing system for the greatest duration of time, or priority could be assigned to each primary task that has been active in the ray tracing system for greater than a threshold duration of time. Any secondary task (e.g. child task, grandchild task, great-grandchild task etc.) into which a ray derived from a primary task to which priority has been assigned is gathered can also have priority assigned to it on the basis that that task has been derived from a primary task to which priority has been assigned. Said priority can also be referred to herein as "primary priority". Tasks to which priority has been assigned (i.e. "priority tasks") can be scheduled in preference to (e.g. in advance of) other tasks to which priority has not been assigned. Scheduling processing in a ray tracing system in this way tends to cause some (priority) primary tasks (and their descendant secondary tasks) to complete their processing ahead of other (non-priority) primary tasks (and their descendant secondary tasks). When a primary task (and its descendant secondary tasks) has completed its processing then its memory can released, so by prioritising some primary tasks over other primary tasks, memory saturation is less likely to occur than if all primary tasks were treated equally. For example, scheduling processing in a ray tracing system in this way may encourage "older" primary tasks (and their descendant secondary tasks) that tend to be closer to completing processing to do so, and therefore to release the memory that they are using to store intermediate data. Scheduling processing in a ray tracing system in this way can reduce the likelihood of memory saturation occurring.

Figure 3:
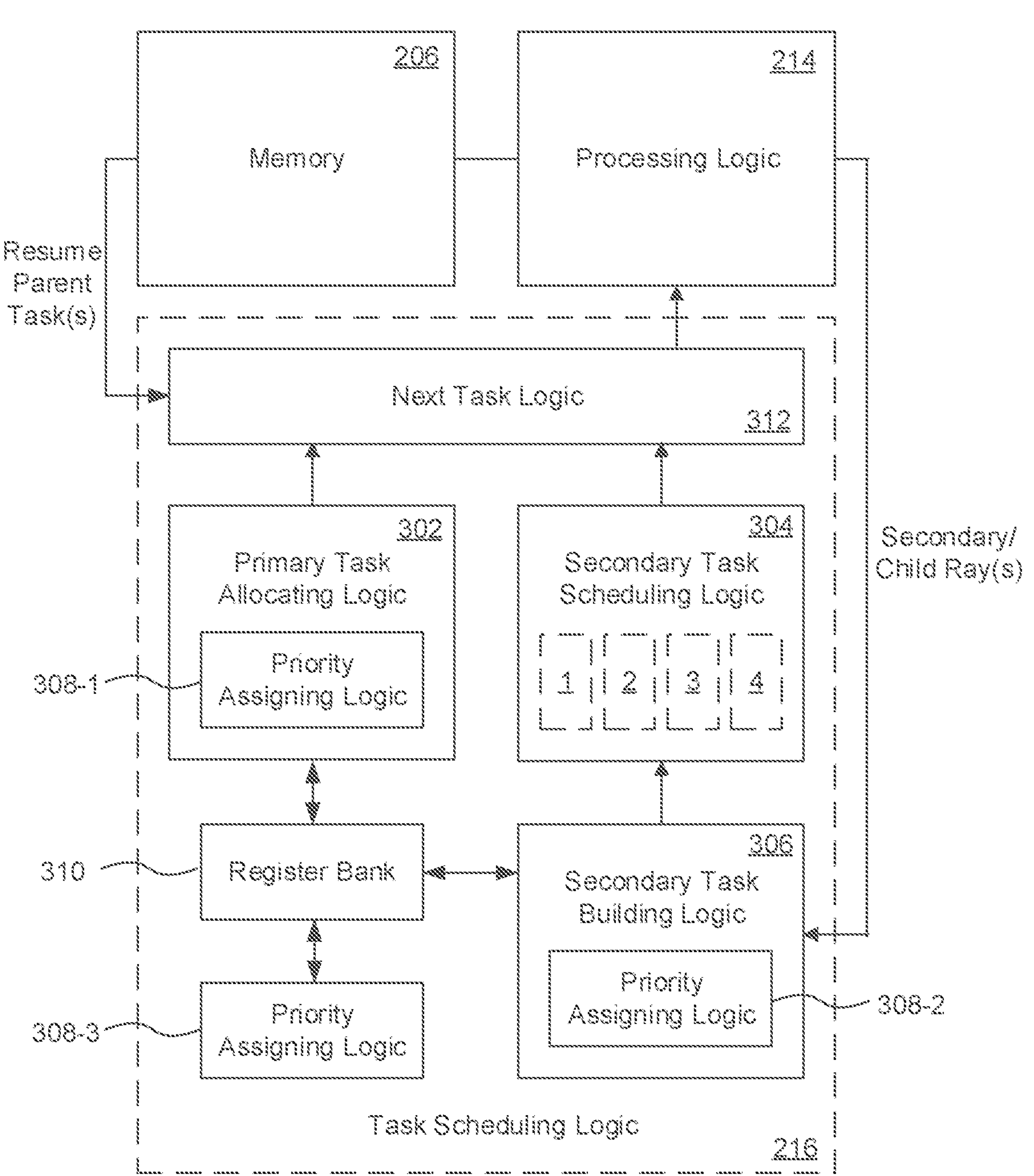
FIG. 3 shows task scheduling logic according to examples described herein.

FIG. 3 shows task scheduling logic 216 according to examples described herein. Task scheduling logic 216 comprises primary task allocating logic 302, secondary task building logic 306, secondary task scheduling logic 304, and next task logic 312—each of which may be implemented in hardware, software, or any combination thereof. Task scheduling logic 216 also comprises priority assigning logic 308-1, 308-2, 308-3. Priority assigning logic 308-1, 308-2, 308-3 may be implemented in hardware, software, or any combination thereof. Priority assigning logic 308-1, 308-2, 308-3 is shown in FIG. 3 as three separate logical units to aid understanding of the principles described herein, but may in fact represent three instances of the same priority assigning logic 308. Task scheduling logic 216 also comprises register bank 310, which may be configured to store identifying information for each task and/or ray active in the ray tracing system. FIG. 3 also shows processing logic 214 and memory 206, which can have the same properties as processing logic 214 and memory 206 described with reference to FIG. 2.

Primary task allocating logic 302 is configured to allocate primary tasks (e.g. tasks implementing ray generation shaders) for processing. In an example, a ray can be identified by a "ray ID" (RID), where the RID identifies a memory allocation (e.g. in memory 206, preferably in a different block of memory to that being used to store the aforementioned intermediate data) per ray. When a primary task is allocated by primary task allocating logic 302, a group of consecutive RIDs may be allocated to that primary task. The RIDs allocated to a primary task may be indicative of a memory address, or a range of memory addresses, in memory (e.g. memory 206) where the block of memory allocated to the primary task can be found. Allocated primary tasks are forwarded to next task logic 312 to be output for processing on processing logic 312.

The ray tracing system may support a limited number of primary rays at a particular time. The limit on the number of primary rays supported by the ray tracing system may be caused by a hardware restriction (e.g. a limit on the memory available for storing data relating to primary rays). For example, the ray tracing system may support up to 2048 primary rays. It can be assumed that each primary task will comprise the maximum number of instances per task (although, as described herein, in reality this is not necessarily the case). For example, as described herein, a task may comprise up to 128 (i.e. $2^7$) instances. Thus, using these examples, the ray tracing system may support up to 16 primary tasks at a particular time (i.e. derived from the number of primary rays supported by the ray tracing system divided by the number of instances per task—2048 divided by 128). Primary task allocating logic 302 may not allocate a new primary task until there is sufficient memory available to support that new primary task. That is, using these examples, the primary task allocating logic 302 may not allocate a new primary task until there is fewer than 16 primary tasks active on the ray racing system.

Priority assigning logic 308-1 is configured to assign priority to one or more of the allocated primary tasks. In an example, at start-up, priority assigning logic 308-1 may assign priority to each of the primary tasks allocated by primary task allocating logic 302, until priority has been assigned to a predefined number, n, of primary tasks active in the ray tracing system. That is, priority assigning logic 308-1 may assign priority to the first n primary tasks allocated by primary task allocating logic 302. To give some examples, n may equal 1, 3, 5, or 10, or any other number that is suitable for the ray tracing system 202. Primary task allocating logic 302 may update register bank 310 by specifying identifying information for each allocated primary task and/or each primary ray in the allocated primary tasks, and by identifying which of those allocated primary tasks have been assigned priority.

As described herein, a ray can be identified by a "ray ID" (RID), where the RID identifies a memory allocation (e.g. in memory 206) per ray. When a 'primary task' is allocated, it may be allocated as a group of consecutive RIDs. That is, the RIDs allocated to a primary task may be indicative of a memory address, or a range of memory addresses, in memory (e.g. memory 206) where the block of memory allocated to the primary task can be found. In an example, if a primary task includes 2 m rays, the least significant m bits of the RID may be unique to, and therefore identify, each primary ray within a primary task. For example, m=7 such that a primary task includes 128 rays, but in other examples, m may equal other numbers. The most significant bits of the RID (e.g. each of the bits other than the m least significant bits) may be common to all of the primary rays in the same primary task. Primary task allocating logic 302 may update register bank 310 to reflect that priority has been assigned to a primary task by allocating a priority flag against an entry specifying the most significant bits of the RID that are common to all of the primary rays in that primary task. More generally, an identifier scheme comprising a 'task ID' that is common to all of the primary rays in a primary task and 'ray ID within a task' that is unique to each primary ray in a primary task can be used in register bank 310. Primary task allocating logic 302 may update register bank 310 to reflect that priority has been assigned to a primary task by allocating a priority flag against an entry specifying the 'task ID' that is common to all of the primary rays in that primary task.

Secondary task building logic 306 is configured to gather secondary rays invoked by tasks being executed in processing logic 214 into secondary tasks. A secondary task is built by gathering a plurality of secondary rays that are to be processed in accordance with the same shader program. As described herein, a task may comprise up to a limited number of instances—although a task may be partially packed and comprise less than that number of instances. For example, a typical task may comprise up to 128 (i.e. $2^7$) instances. Secondary task building logic 306 may use a cache structure to gather secondary rays that are to be processed in accordance with the same shader program. Secondary task building logic 306 can concurrently build multiple secondary tasks by "sorting" secondary rays received from processing logic 214 into sets of secondary rays that are to be processed in accordance with the same shader program. In an example, secondary task building logic 306 may build a secondary task when the number of secondary rays gathered that are to be processed in accordance with the same shader program reaches the maximum number of instances permitted in a task. Alternatively, or additionally, secondary task building logic 306 may start a countdown timer when the first secondary ray that is to be processed in accordance with a certain shader program is received, and build a secondary task for that shader program when the countdown timer expires. This approach prevents a secondary task relating to a shader program that fewer than the maximum number of instances permitted in a task are to be processed in accordance with waiting indefinitely to be built.

Priority assigning logic 308-2 is configured to assign priority to each of the secondary tasks into which at least one secondary ray derived from a primary task to which priority has been assigned has been gathered. A secondary ray may be deemed to have been derived from a primary task if it was invoked by a shader recursion instruction executed by an instance of that primary task, or if it was invoked by a shader recursion instruction executed by an instance of a secondary task that itself was invoked by a shader recursion instruction executed by an instance of that primary task, and so on. In other terminology, understanding a "shader call" to be initiated by a shader recursion instruction, a "shader call chain" may be the result of a series of shader recursion instructions, and any secondary ray may be deemed to be derived from a particular primary task if it is part of a shader call chain that originates with that primary task. That is, if a secondary ray can be traced back to a primary ray of a primary task through any number of ray recursion events (or in other words, if the secondary ray is a descendant of the primary ray), then it can be deemed to have been derived from that primary task. In order to determine which secondary rays are derived from a primary task to which priority has been assigned, priority assigning logic 308-2 may reference ray identifying information stored in register bank 310. In an example, when a child ray is invoked it continues to use the same RID as its parent ray—but updates the allocated storage with values for the child ray. That is, a secondary ray that can be traced back to a primary ray of a primary task via a series of ray recursion events may share a RID with that primary ray. Thus, priority assigning logic 308-2 can determine which secondary rays are derived from a primary task to which priority has been assigned by inspecting the RIDs of the secondary rays. In an example, priority assigning logic 308-2 may inspect the most significant bits of a secondary ray's RID and determine whether a priority flag has been allocated against those bits of the RID in register bank 310.

It is to be understood that priority assigning logic 308-2 may not need to check what task each and every secondary ray gathered into a secondary task has been derived from. This is because priority assigning logic 308-2 may be configured to assign priority to each secondary task into which at least one secondary ray derived from a primary task to which priority has been assigned has been gathered. Thus, once priority assigning logic 308-2 has determined that one secondary ray derived from a primary task to which priority has been assigned has been gathered into a secondary task, it can assign priority to that secondary task, and need not continue checking all of the other secondary rays gathered into that secondary task.

It is to be understood that priority assigning logic 308-2 may require a different threshold number of secondary rays derived from a primary task to which priority has been assigned to have been gathered into a secondary task before priority is assigned to that secondary task. In an example, the threshold number may be determined as a percentage of the total number of rays gathered into a secondary task. For example, the threshold number may be 5% of the total number of rays gathered into a secondary task.

Secondary tasks that have been built by secondary task building logic 306 are forwarded to secondary task scheduling logic 304. Secondary task scheduling logic 304 is configured to schedule secondary tasks for processing by forwarding secondary tasks to next task logic 312. Secondary task scheduling logic 304 is configured to schedule secondary tasks to which priority has been assigned in preference to other secondary tasks to which priority has not been assigned. In an example implementation, secondary task scheduling logic 304 includes queues for tasks that are to be scheduled. Secondary task scheduling logic 304 includes a first queue 1 for tasks to which priority has been assigned and a second queue 2 for tasks to which priority has not been assigned. Secondary task scheduling logic 304 preferentially schedules tasks from the first queue 1 if any such tasks are present, if not, tasks are scheduled from the second queue 2. That is, secondary task scheduling logic 304 may schedule tasks for processing from the second queue 2 only when no tasks are present in the first queue 1.

In an example, queues as described herein for tasks that are to be scheduled can be implemented using linked lists. A linked list can be used to define the order of a plurality of tasks independent of their physical placement in memory. For example, a linked list can be used to identify the rays which make up one task. The same linked list memory can be used to link the last ray of a task to the first ray of the next task. The dedicated logic per queue can be initialised to empty, and when the first task is added to a queue the first and last ray in the task is also stored as the first and last entry of the queue. If another task is to be added to the queue, the last ray in the queue is updated to link to the first ray in the task which is added (and the last ray of the new task is saved as last ray of the queue). When reading tasks out of the queue, if the read gets to the last ray of the last task in the queue, the fact the ray ID matches the last recorded entry in the queue may indicate the queue is now empty.

In some examples, tasks to which priority has been assigned can be further preferentially scheduled by applying a delay before tasks to which no priority has been assigned (i.e. non-priority tasks) are scheduled. This could be implemented in different ways—for example the delay could be implemented following the scheduling of any type of task if a priority task is not immediately available for scheduling, or in other implementations the delay may only be implemented following the scheduling of a non-priority task, to prevent another non-priority task being immediately scheduled (i.e. the scheduling delay could be implemented between non-priority tasks). Irrespective of the particular implementation, in these examples there are situations in which even if no (i.e. zero) tasks to which priority has been assigned are currently queued in the first queue 1, secondary task scheduling logic 304 may delay before scheduling tasks to which no priority has been assigned that are queued in the second queue 2. For example, the delay may be 1000 clock cycles, or 10,000 clock cycles. This delay provides more time for tasks to which priority has been assigned to arrive at the secondary task scheduling logic 304, and so to be scheduled in preference to tasks to which no priority has been assigned. In other words, prior to scheduling a task to which priority has not been assigned, secondary task scheduling logic 304 may delay for a period of time without scheduling said task. If a task to which priority has been assigned becomes available for scheduling during the period of time, secondary task scheduling logic 304 may schedule the task to which priority has been assigned in preference to the task to which priority has not been assigned. If no task to which priority has been assigned becomes available for scheduling during the period of time, secondary task scheduling logic 304 may schedule the task to which no priority has been assigned.

As described herein, intermediate data relating to a task occupies memory until the recursive series of tasks derived from that task has completed processing. When a task to which no priority has been assigned is scheduled, the memory used for the storage of intermediate data relating to that task is no longer available for the storage of intermediate data relating to tasks to which priority has been assigned—and may remain unavailable for a relatively long period of time (as a task will only finish, releasing its assigned memory, when all its descendent tasks have completed). That period of time can be greater where a task to which priority has been assigned becomes available for scheduling and is scheduled soon after a task to which no priority has been assigned has been scheduled. This is because, according to the principles described herein, tasks derived from the task to which priority has been assigned are subsequently assigned priority, and thereby would be scheduled in preference to tasks derived from the task to which no priority has been assigned when those tasks are available for scheduling at the same time—the likelihood of which is increased when said non-priority and priority tasks are scheduled in quick succession. As a result, the amount of time before the memory used for the storage of intermediate data relating to a task to which no priority has been assigned becomes available again can be greater. Hence, a delay as described herein can be advantageous so as to avoid a task to which no priority has been assigned being scheduled soon before a task to which priority has been assigned becomes available for scheduling.

The delay may be adaptive. In an example, the period of time may be adaptive in dependence on the amount of memory available to the ray tracing system for storage of intermediate data relating to tasks present in the ray tracing system. For example, longer delays may be applied the closer the available memory is to being saturated. In another example, the period of time may be adaptive in dependence on the number of secondary tasks active in the ray tracing system. For example, longer delays may be applied the greater the number of secondary tasks active in the ray tracing system. In other examples, the delay may only be applied if the amount of memory available drops below a particular threshold (or, put another way, the delay may be reduced to zero if the amount of memory available exceeds a particular threshold).

Returning to secondary task building logic 306, each of the plurality of rays gathered into a secondary task may have been invoked by rays of the same parent task. This can occur when a plurality of rays associated with that parent task interact with the same object. Alternatively, a secondary task may comprise instances corresponding to secondary rays emitted from two or more different parent tasks. In this case, priority assigning logic 308-2 may be configured to assign a secondary priority to each of the secondary rays of a secondary task to which priority has been assigned, but that are not themselves derived from a primary task to which priority has been assigned. Secondary task building logic 306 may update register bank 310 by specifying which secondary rays have been assigned secondary priority. This can be achieved by, for example, allocating a secondary priority flag against an entry in register bank 310 specifying the RID of that secondary ray. Any secondary rays derived from a secondary ray to which secondary priority has been assigned may also inherit that secondary priority, for example, because, as described herein, when a child ray is invoked it uses the same RID as its parent ray.

When the secondary task building logic 306 builds a secondary task into which at least one secondary ray derived from a secondary ray to which secondary priority has been assigned has been gathered, and into which no (i.e. zero) secondary rays derived from a primary task to which priority has been assigned have been gathered, priority assigning logic 308-2 may be configured to assign a secondary priority to that secondary task. Priority assigning logic 308-2 can determine which secondary rays (e.g. child rays) are derived from secondary rays (e.g. parent rays) to which secondary priority has been assigned by inspecting the RIDs of those secondary rays (e.g. child rays). In an example, priority assigning logic 308-2 may inspect a secondary ray's RID and determine whether a secondary priority flag has been allocated against that RID in register bank 310. It is to be understood that priority assigning logic 308-2 may require a different threshold number of secondary rays derived from secondary rays to which secondary priority has been assigned to have been gathered into a secondary task before secondary priority is assigned to that secondary task. In an example, the threshold number may be determined as a percentage of the total number of rays gathered into a secondary task. For example, the threshold number may be 5% of the total number of rays gathered into a secondary task. As described herein, secondary tasks that have been built by secondary task building logic 306 are forwarded to secondary task scheduling logic 304.

For completeness, it is noted that in some circumstances it may be desirable to assign all new rays which are created a secondary priority. For example, if the amount of memory available drops below a particular threshold (e.g. in the same situation as considered above for introducing a delay before executing non-priority tasks), it may be beneficial to assign a newly created ray a secondary priority even if it is not derived from a ray to which secondary priority was previously assigned. Such rays will then be gathered into new tasks that are allocated a secondary priority, which in turn will be prioritised over tasks without a priority (e.g. tasks created before the threshold condition was met). This may assist in causing primary tasks to complete (even if they were not marked as priority tasks), and thus free extra resources.

Secondary task scheduling logic 304 may be configured to schedule secondary tasks to which secondary priority has been assigned in preference to other secondary tasks to which no priority has been assigned. An advantage of this approach is that the processing of descendant rays derived from secondary rays gathered into a secondary task with rays derived from primary tasks to which priority has been assigned is partially prioritised so as to encourage those descendant rays to complete processing, so that processing of that secondary task can be completed. That is, this approach prevents the descendant rays derived from secondary rays that, (i) are not themselves derived from primary tasks to which priority has been assigned, but (ii) have been gathered into a secondary task with rays derived from primary tasks to which priority has been assigned, from substantially delaying the processing of that secondary task. Secondary task scheduling logic 304 may be configured to schedule secondary tasks to which priority has been assigned in preference to secondary tasks to which secondary priority has been assigned.

Returning to the example implementation in which secondary task scheduling logic 304 includes queues for tasks that are to be scheduled, secondary task scheduling logic 304 may further include a third queue 3 for tasks to which secondary priority has been assigned. Secondary task scheduling logic 304 may preferentially schedule tasks to which priority has been assigned from the first queue 1 if any such tasks are present, if not, tasks to which secondary priority has been assigned may be scheduled from the third queue 3. If no tasks to which secondary priority has been assigned are queued in the third queue 3, then tasks to which no priority has been assigned may be scheduled from the second queue 2. In other words, secondary task scheduling logic 304 may be configured to schedule tasks for processing from the second queue 2 only when no tasks are present in the first queue 1 and no tasks are present in the third queue 3, and to schedule tasks for processing from the third queue 3 only when no tasks are present in the first queue 1.

Tasks to which priority has been assigned can be further preferentially scheduled by applying a delay before tasks to which secondary priority has been assigned and tasks to which no priority has been assigned are scheduled. That is, even if no (i.e. zero) tasks to which priority has been assigned are currently queued in the first queue 1, secondary task scheduling logic 304 may delay before scheduling tasks to which tasks to which secondary priority has been assigned that are queued in the third queue 3 and tasks to which no priority has been assigned that are queued in the second queue 2. In other words, prior to scheduling a task to which no priority has been assigned, secondary task scheduling logic 304 may delay for a period of time without scheduling said task. If a task to which priority has been assigned becomes available for scheduling during the period of time, secondary task scheduling logic 304 may schedule the task to which priority has been assigned in preference to the task to which no priority has been assigned. If a task to which secondary priority has been assigned becomes available for scheduling during the period of time, secondary task scheduling logic 304 may schedule the task to which secondary priority has been assigned in preference to the task to which priority has not been assigned. If no task to which priority or secondary priority has been assigned becomes available for scheduling during the period of time, secondary task scheduling logic 304 may schedule the task to which no priority has been assigned.

Next task logic 312 may be configured to receive as inputs: primary tasks from primary task allocating logic 302; secondary tasks from secondary task scheduling logic 304; and parent tasks (be they primary or secondary tasks) from memory 206 for which processing is to be resumed. Next task logic 312 may be configured to output the next task to be processed to processing logic 214. Next task logic 312 may output the next task to be processed irrespective of whether or not priority has been assigned to the task(s) received as inputs. For example, next task logic 312 may operate on a first in, first out basis. That is, next task logic 312 may comprise a first-in, first-out buffer. Alternatively, each of primary task allocating logic 302, secondary task scheduling logic 304, and memory 206 may indicate if a task (e.g. a new primary task, a secondary task, or a parent task to be resumed, respectively) is available for processing. Next task logic 312 may be configured to output tasks for processing from the primary task allocating logic 302, the secondary task scheduling logic 304, and the memory 206 using a "round-robin" (e.g. circular) approach. That is, next task logic 312 may be configured to output a task for processing from each of those sources of tasks in turn. Next task logic 312 may be configured to skip a source (i.e. not output a task for processing from that source) in a round if it does not indicate that a task is available for processing at that particular time.

Next task logic 312 may be configured to temporarily disable the outputting of primary tasks for processing, whilst continuing to output secondary tasks and/or suspended parent tasks returning from memory for processing. This is because secondary tasks and/or suspended parent tasks returning from memory are likely to be closer to their maximum recursion depth than a new primary task, and in any case are typically less likely to emit new rays than a new primary task, and therefore likely to be closer to completing processing and releasing the memory used by that task and its recursive series of descendant tasks for storing intermediate data than a new primary task would be. In an example, next task logic 312 may be configured to assess the amount of memory available to the ray tracing system for storage of intermediate data relating to tasks present in the ray tracing system, and to temporarily disable the outputting of primary tasks if it is determined that the mount of available memory is below a threshold. In another example, next task logic 312 may be configured to assess the number of secondary tasks active in the ray tracing system, and to temporarily disable the outputting of primary tasks if it is determined that the number of secondary tasks active in the ray tracing system is above a threshold.

When a primary task to which priority has been assigned completes processing, priority assigning logic 308-3 may be configured to assign priority to another primary task active in the ray tracing system. In this way, the number of primary tasks to which priority is assigned is maintained. For example, priority assigning logic 308-3 may assign priority to the "next oldest" primary task active in the ray tracing system to which priority has not been assigned. Priority assigning logic 308-3 may reference the ray identifying information stored in register bank 310 in order to determine (i) when a primary task to which priority has been assigned has completed processing, and (ii) which of the remaining active primary tasks to assign priority to (e.g. the "oldest" of the remaining primary tasks to which priority has not yet been assigned, or based on the spatial origin of the rays associated with the completed primary task and the remaining primary tasks to which priority has not yet been assigned). In an example, primary task allocating logic 302 may be configured to allocate groups of RIDs to new primary tasks in sequence. In this example, priority assigning logic 308-3 may determine the next primary task to assign priority to by identifying the group of RIDs earliest in the sequence, following the last group of RIDs corresponding to a task to which priority was assigned, to which priority has not yet been assigned. In another example, the register bank 310 may maintain an age counter associated with each active primary task and indicative of the age of that task. In this example, priority assigning logic 308-3 may determine the next oldest primary task to assign priority to by inspecting said age counters. Priority assigning logic 308-3 may update register bank 310 by identifying which primary task has been assigned priority. For example, priority assigning logic 308-3 may update register bank 310 to reflect that priority has been assigned to a primary task by allocating a priority flag against an entry specifying the most significant bits of the RID that are common to all of the primary rays in that primary task.

In other words, a primary task that is not initially assigned priority by priority assigning logic 308-1 can later be assigned priority by priority assigning logic 308-3. Such a primary task, and the recursive series of secondary tasks derived from it, may begin processing by being scheduled as tasks to which no priority is assigned. Then, subsequent to priority being assigned to the primary task by priority assigning logic 308-3, any secondary tasks into which rays derived from that primary task are gathered may be scheduled as tasks to which priority has assigned, as described herein.

In less preferable example, priority may always be assigned to the primary tasks allocated the same one or more groups of RIDs. That is, as described herein, there may be a set number (e.g. sixteen) groups of RIDs that can be allocated to primary tasks. For example, these groups of RIDs could be labelled RID1, RID2 RID16. It would be possible to assign priority to the primary tasks allocated a subset of those groups of RIDs. For example, any task allocated to any of RID1 to RID5 may be assigned priority when it is allocated. When one of those primary tasks completes processing, priority assigning logic 308-1 or 308-3 may assign priority to the new primary task that is allocated that group of RIDs.

When a primary task to which priority has been assigned completes processing, priority assigning logic 308-3 may be configured to clear (e.g. unassign) any secondary priority assigned to secondary rays that had been gathered into secondary tasks with secondary rays derived from that primary task. Priority assigning logic 308-3 may update register bank 310 to reflect this. This can be achieved by, for example, de-allocating the secondary priority flag previously allocated against an entry in register bank 310 specifying the RID of those secondary rays. The RIDs of the rays associated with a completed primary task (i.e. in the shader call chain originating with the primary task) may be re-allocated to a new task, which may involve re-initialising the flags for those particular RIDs.

The prioritisation scheme described above relates to recursive tasks (i.e. tasks that run shaders in which the rays of that task have the potential to generate child rays). Non-recursive task may also be used during ray tracing. An example of a non-recursive task is a traverse task. Task scheduling logic may schedule non-recursive tasks in preference to recursive tasks—as these tasks can typically be processed quickly, do not typically require a memory allocation to store intermediate data, and can provide information required for the processing of recursive tasks. Returning to the example implementation in which secondary task scheduling logic 304 includes queues for tasks that are to be scheduled, secondary task scheduling logic 304 may further include a fourth queue 4 for non-recursive tasks. Secondary task scheduling logic 304 may preferentially schedules tasks from the fourth queue 4 if any such tasks are present, if not, tasks may be scheduled from the first, second or third queues as previously described herein.

Figure 4:
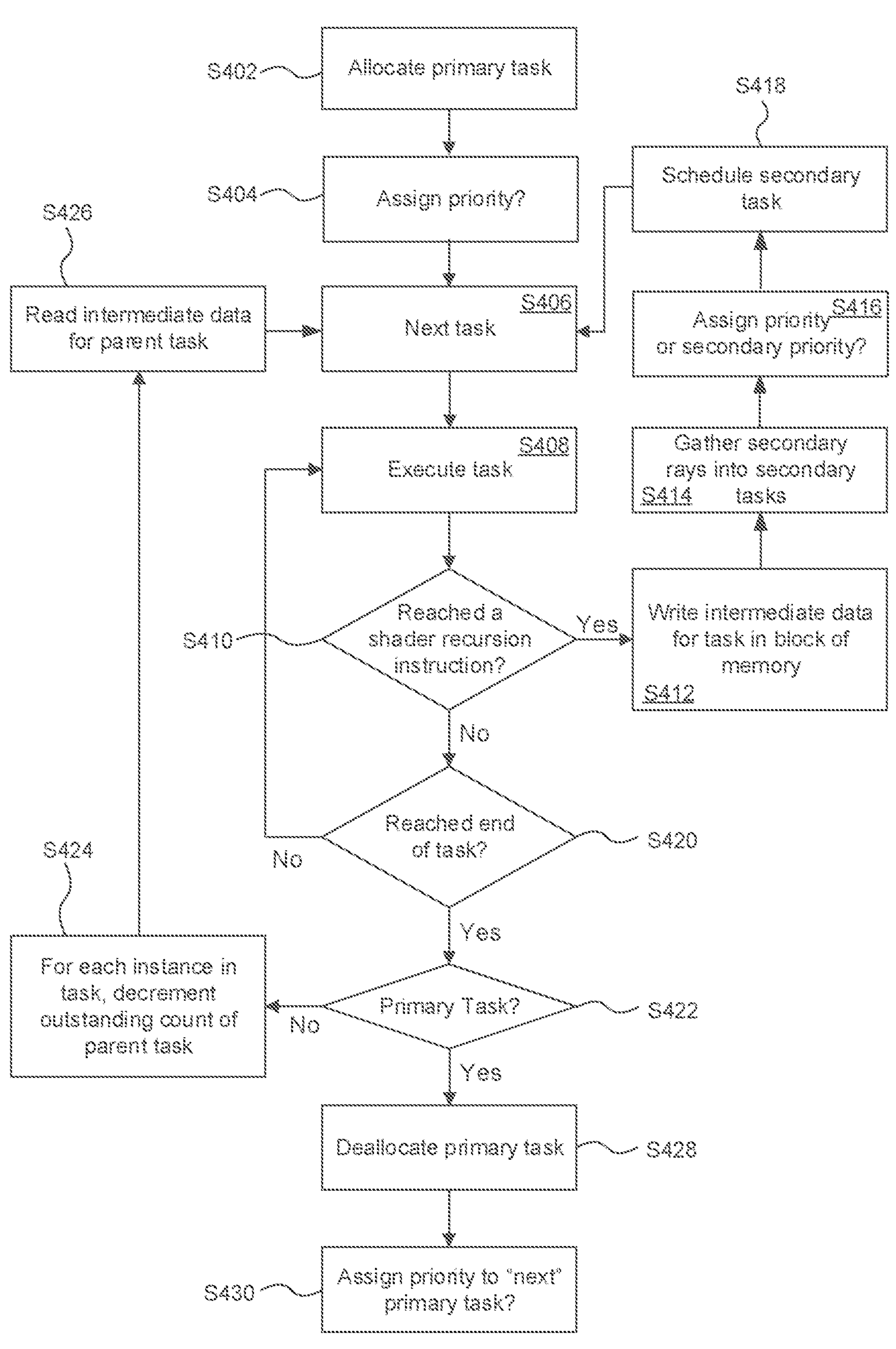
FIG. 4 is a flow chart for a method of scheduling processing in a ray tracing system according to examples described herein.

FIG. 4 is a flow chart for a method of scheduling processing in a ray tracing system according to examples described herein. In the following paragraphs, FIG. 4 will be described with reference to the processing of an individual primary task. The ray tracing system may process each primary task in accordance with the same principles as described herein with reference to FIG. 4.

In step S402, a primary task is allocated for processing. This step may be performed by primary task allocating logic 302, as described herein with reference to FIG. 3. A primary task is a task that does not itself have a parent task. A primary task is a task implementing a ray generation shader so as to launch one or more primary rays.

In step S404, it is determined whether to assign priority to the primary task. This step may be performed by priority assigning logic 308-1, as described herein with reference to FIG. 3. For the purposes of this example, priority is assigned to the primary task.

In step S406, the primary task is output for processing. This step may be performed by next task logic 312, as described herein with reference to FIG. 3.

In step S408, the instructions of the primary task are executed. This step may be performed by processing logic 214, as described herein with reference to FIGS. 2 and 3. In particular, on this first iteration, the primary task is executed for a plurality of primary rays. In this example, the primary task includes at least one instance of a shader program corresponding to a primary ray, that instance of the shader program including a shader recursion instruction which invokes a child shader. For example, the processing of an instance of the primary task may cause at least one child ray to be emitted. As described herein, two examples of shader recursion instructions are TraceRay instructions and CallShader instructions.

In step S410, it is determined whether the execution of any of the instances of the primary task has reached a recursion instruction. This step may be performed by processing logic 214, as described herein with reference to FIGS. 2 and 3. If not, then the method passes to step S420 in which it is determined whether the execution of the task has reached the end of the shader program, i.e. whether there are no more instructions of the task still to execute. This step may be performed by processing logic 214, as described herein with reference to FIGS. 2 and 3. If not (i.e. if there are still more instructions of the primary task to execute) then the method passes back to step S408 and the execution of the instructions of the primary task continues.

When the primary task reaches a shader recursion instruction, the method passes from step S410 to step S412. In step S412, the processing of the primary task for the plurality of rays is suspended (i.e. temporarily ended on the processing logic 214), and intermediate data for the primary task is written to memory (e.g. memory 206 described herein with reference to FIGS. 2 and 3). In this way, the processing of the primary task is suspended in response to the shader recursion instruction. The memory is used to retain the intermediate data for the primary task and to potentially have part of it (e.g. the stored payload data) updated by a child shader associated with child rays emitted by the primary task. Memory 206 is used by the primary task to hold information (i.e. state data, task information and payload data) for use past the shader recursion instruction which was reached in step S410. Since execution of the primary task has been suspended (i.e. temporarily ended on the processing logic 214), the current state of the primary task (including state data, task information and payload data) is retained, so when the primary task resumes (as described in further detail below), that state of the primary task can be restored such that the execution of the primary task can be resumed.

Also, in step S412, a counter may be initialised for the primary task that is used to keep track of how many child rays emitted by that task are yet to have completed processing. For example, the counter may be incremented once for each child ray emitted by the primary task which is yet to have completed processing.

After the execution of the primary task is suspended in step S412, the method passes to step S414. In step S414, one or more child rays emitted by the primary task that are to be processed in accordance with the same child shader program are gathered into a child task. This step may be performed by secondary task building logic 308-2, as described herein with reference to FIG. 3. A secondary task (e.g. the child task) is a task which has a parent task (e.g. in this iteration, the parent task is the primary task). A secondary task is a task that comprises a plurality of instances of a secondary shader program corresponding to a respective plurality of secondary rays for which that secondary shader program is to be executed. Each of the plurality of secondary instances in a secondary task may correspond to child rays emitted from the same parent task (e.g. the primary task). This can occur when a plurality of rays associated with the primary task interact with the same object. Alternatively, a secondary task may comprise a plurality of secondary instances corresponding to secondary rays emitted by two or more different parent tasks. That is, child rays emitted by the primary task and rays emitted by one or more other tasks may be gathered into the child task.

In step S416, it is determined whether to assign priority to the child task. This step may be performed by priority assigning logic 308-2, as described herein with reference to FIG. 3. In this example, priority is assigned to the child task on the basis that one or more child rays of the child task are derived from the primary task to which priority has been assigned. That is, priority is assigned to the child task if one or more child rays of the child task are derived from the primary task to which priority has been assigned. In other words, priority is assigned to the child task in response to one or more child rays of the child task being derived from the primary task to which priority has been assigned.

Optionally, also in step S416, it is determined whether to assign secondary priority to any of the rays of the child task. This step may be performed by priority assigning logic 308-2, as described herein with reference to FIG. 3. For the purposes of this example, it can be assumed that one or more secondary rays gathered into the child task were derived from tasks (e.g. primary tasks) to which priority has not been assigned, and that secondary priority is assigned to those rays.

In step S418, the child task is scheduled for processing in preference to one or more other tasks to be scheduled to which priority has not been assigned. This step may be performed by secondary task scheduling logic 304, as described herein with reference to FIG. 3.

The method returns to step S406, where, in this iteration, the child task is output for processing. This step may be performed by next task logic 312, as described herein with reference to FIG. 3.

In step S408, instructions of the child task are executed. This step may be performed by processing logic 214, as described herein with reference to FIGS. 2 and 3. As described herein, the shader recursion instruction indicates payload data for each ray to be processed in accordance with the child task. The execution of the child task in step S408 may update said indicated payload data in the memory allocated to the primary task.

The method proceeds for the child task in steps S408, S410, S420 and S412 in the same manner as described above for the primary task. In this example, the child task includes at least one instance of a shader program corresponding to a child ray, that instance of the shader program including a shader recursion instruction which invokes a grandchild shader. For example, the processing of an instance of the child task may cause at least one grandchild ray to be emitted. When such a shader recursion instruction is reached, in step S412 the execution of the child task is suspended and intermediate data for the child task is written to memory, in in the same manner as described above for the primary task.

After the execution of the child task is suspended in step S412, the method passes to step S414. In step S414, one or more grandchild rays emitted by the child task that are to be processed in accordance with the same shader program are gathered into a grandchild task. This step may be performed by secondary task building logic 308-2, as described herein with reference to FIG. 3.

In step S416, it is determined whether to assign priority to the grandchild task. This step may be performed by priority assigning logic 308-2, as described herein with reference to FIG. 3. As described herein, in this example, secondary rays derived from two or more different parent tasks (e.g. the primary task and at least one other task) were gathered into the child task. One or more of those secondary rays gathered into the child task were derived from tasks (e.g. different primary tasks) to which priority has not been assigned—and so those secondary rays were assigned secondary priority in the first iteration of step S416.

In a first example, at least one grandchild ray derived from the primary task to which priority was assigned in step S404 is gathered into the grandchild task. In this first example, in step S416, priority assigned to that grandchild task on the basis that one or more rays of that grandchild task are derived from the primary task to which priority has been assigned. This step may be performed by secondary task scheduling logic 304, as described herein with reference to FIG. 3. The method proceeds for such a grandchild task in steps S418, S406, S408, S410, and S420 in the same manner as described above for the child task.

In a second example, one or more grandchild rays emitted by child rays having been assigned the secondary priority are gathered into the grandchild task, and none (i.e. zero) of the rays gathered into the grandchild task are derived from a primary task to which priority has been assigned. In this second example, in step S416, secondary priority is assigned to that grandchild task. In step S418, such a grandchild task is scheduled for processing in preference to one or more other tasks to be scheduled to which priority has not been assigned. That said, in step S418, one or more other tasks to which priority has been assigned are scheduled in preference to the grandchild task to which secondary priority has been assigned. This step may be performed by secondary task scheduling logic 304, as described herein with reference to FIG. 3. The method proceeds for such a grandchild task in steps S406, S408, S410 and S420 in the same manner as described above for the child task.

If the grandchild task includes at least one instance that invokes a shader recursion instruction then the loop around steps S412 to S418 may be performed again, such that a further secondary task (e.g. a great-grandchild task having the grandchild task as its parent task) is invoked by one or more of the plurality of instances of the grandchild task. Each instance of the primary task may continue recursing up to a maximum recursion depth at which point any further recursion is prevented (not shown in FIG. 3). The API may define the maximum recursion depth. For example, the maximum recursion depth may be 31.

At some point, the method will perform step S420 for a secondary task (e.g. the grandchild task, or a subsequent generation of descendant task) and it will be determined that the end of that secondary task has been reached, such that the 'yes' route is taken from step S420. The payload that was provided to that secondary task from its parent task (e.g. a secondary task from a previous iteration of steps S412 to S418) may have been modified by the execution of that secondary task or by the execution of any tasks which are the descendants of the secondary task.

The method then passes to step S422 in which it is determined whether the task is the primary task. In other words, it is determined whether the primary task (i.e. the original parent task, e.g. implementing a ray generation shader) is currently active. In this iteration, the task is a secondary task and so the method passes to S424.

In step S424, for each instance in the secondary task that has completed processing the counter initialised in step S412 for its parent task(s) are decremented (as described herein, a secondary task may comprise instances associated with one or more parent tasks). If an instance from the secondary task that has completed processing causes the counter for one or more of the secondary task's parent tasks to be decremented to 0 (e.g. indicating that all of the child rays emitted by that parent task have completed processing), this indicates that that parent task is ready to resume.

In step S426 intermediate data for the parent task to be resumed is read. For example, one or more of the state data, task information and payload data for the parent task may be read from the memory allocated to that task. The method can then pass to step S406, where, in this iteration, the parent task to be resumed is output for processing. This step may be performed by next task logic 312, as described herein with reference to FIG. 3.

In step S408, more instructions of the parent task are executed, i.e. instructions of the parent task after the shader recursion instructions which caused one or more child rays to be emitted. This step may be performed by processing logic 214, as described herein with reference to FIGS. 2 and 3. In this way, the execution of the parent task is resumed.

The method can then proceed as described above from step S408. When the method gets to step S422 and the task is determined to be the primary task (i.e. the original parent task is active) then the processing for the primary task is complete. At this point the ray tracing system 202 has determined a rendered value for a plurality of sample positions in the rendering space (corresponding to the plurality of primary rays of the primary task), which may, for example, be pixel colour values for pixels of the image being rendered. In step S428, the primary task can be deallocated. At this stage, the memory used by the primary task to store intermediate data, and the memory used by each task in the recursive series of secondary tasks derived from the primary task to store intermediate data, has been released.

Finally, in step S430, priority is assigned to a different primary task active in the ray tracing system. This step may be performed by priority assigning logic 308-3, as described herein with reference to FIG. 3. Optionally, also in step S430, any secondary priority assigned to secondary rays that had been gathered into secondary tasks with secondary rays derived from the primary task allocated in step S402 are cleared. This step may be performed by priority assigning logic 308-3, as described herein with reference to FIG. 3.

Figure 5:
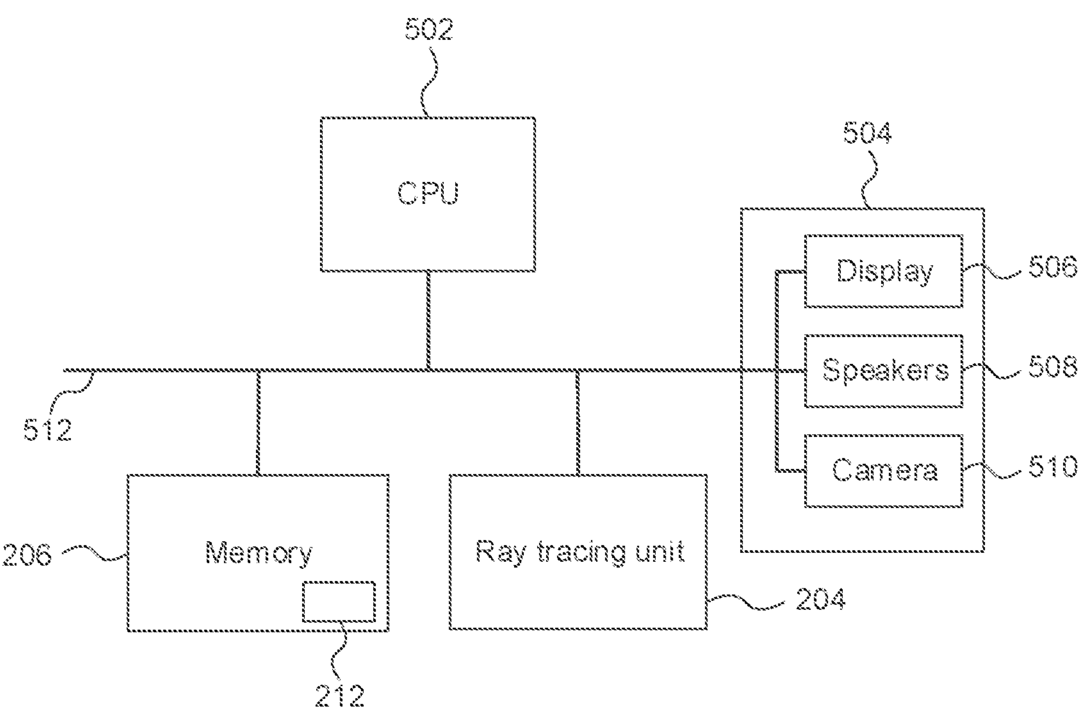
FIG. 5 shows a computer system in which a ray tracing processing system according to examples described herein is implemented.

FIG. 5 shows a computer system in which the ray tracing systems described herein may be implemented. The computer system comprises a CPU 502, the memory 206, the ray tracing unit 204 and other devices 504, such as a display 506, speakers 508 and a camera 510. The memory 206 comprises the block of memory 212. The components of the computer system can communicate with each other via a communications bus 512.

The ray tracing system 202 of FIGS. 2 and 3 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing systems described herein may be embodied in hardware on an integrated circuit. The ray tracing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing system configured to perform any of the methods described herein, or to manufacture a ray tracing system comprising any apparatus described herein. An integrated circuit definition dataset may be, for example, an integrated circuit description.

Therefore, there may be provided a method of manufacturing, at an integrated circuit manufacturing system, a ray tracing system as described herein. Furthermore, there may be provided an integrated circuit definition dataset that, when processed in an integrated circuit manufacturing system, causes the method of manufacturing a ray tracing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS(®) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing system will now be described with respect to FIG. 6.

Figure 6:
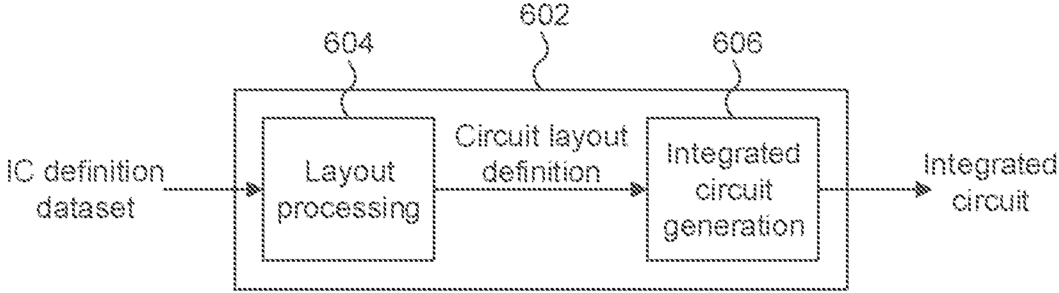
FIG. 6 shows an integrated circuit manufacturing system for generating an integrated circuit embodying a ray processing system according to examples described herein.

FIG. 6 shows an example of an integrated circuit (IC) manufacturing system 602 which is configured to manufacture a ray tracing system as described in any of the examples herein. In particular, the IC manufacturing system 602 comprises a layout processing system 604 and an integrated circuit generation system 606. The IC manufacturing system 602 is configured to receive an IC definition dataset (e.g. defining a ray tracing system as described in any of the examples herein), process the IC definition dataset, and generate an IC according to the IC definition dataset (e.g. which embodies a ray tracing system as described in any of the examples herein). The processing of the IC definition dataset configures the IC manufacturing system 602 to manufacture an integrated circuit embodying a ray tracing system as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of scheduling processing in a ray tracing system, the method comprising:

assigning primary priority to a first parent task;

processing the first parent task so as to emit at least one child ray;

processing a second parent task to which primary priority has not been assigned so as to emit at least one child ray;

gathering child rays into a child task, wherein said gathering comprises gathering, into the child task:

one or more child rays emitted by the first parent task to which primary priority has been assigned; and one or more child rays emitted by the second parent task to which primary priority has not been assigned;

assigning primary priority to the child task on the basis that one or more child rays of the child task are derived from the first parent task to which primary priority has been assigned;

determining whether to allocate a flag to any of the child rays of the child task, wherein flag is allocated to each of one or more child rays of the child task on the basis that they are derived from the second parent task to which primary priority has not been assigned, wherein the flag allocated to each of said one or more child rays of the child task is for subsequent use in determining whether to assign a secondary priority to one or more grandchild tasks into which one or more grandchild rays derived from the child task are gathered; and scheduling the child task for processing in preference to one or more other tasks to be scheduled to which primary priority has not been assigned.

2. The method of claim 1, further comprising scheduling the first parent task for processing in preference to one or more other tasks to be scheduled to which primary priority has not been assigned.

3. The method of claim 1, wherein the first parent task is a primary task.

4. The method of claim 1, wherein one or more parent rays of the first parent task are derived from a primary task to which primary priority has been assigned.

5. The method of claim 3, wherein a plurality of primary tasks are active in the ray tracing system at a particular time.

6. The method of claim 5, further comprising assigning primary priority to one or more primary tasks of the plurality of primary tasks in dependence on the relative age of each of the primary tasks.

7. The method of claim 5, further comprising assigning primary priority to multiple primary tasks of the plurality of primary tasks, wherein the number of primary tasks that, at the particular time, are active in the ray tracing system to which primary priority can be assigned is limited to a predefined number.

8. The method of claim 3, wherein a primary task is a task that does not itself have a parent task.

9. The method of claim 3, wherein a primary task is a task implementing a ray generation shader so as to launch one or more primary rays.

10. The method of claim 1, further comprising:

processing the child task so as to emit one or more grandchild rays;

gathering one or more grandchild rays emitted by the child task in respect of said one or more child rays to which the flag has been allocated into a grandchild task, none of the rays gathered into the grandchild task being derived from a primary task to which primary priority has been assigned;

assigning a secondary priority to the grandchild task; and scheduling the grandchild task for processing in preference to one or more other tasks to be scheduled to which neither primary priority, nor secondary priority, has been assigned.

11. The method of claim 10, wherein scheduling the grandchild task for processing comprises scheduling one or more other tasks to which primary priority has been assigned in advance of the grandchild task to which secondary priority has been assigned.

12. The method of claim 1, further comprising, prior to scheduling a task to which primary priority has not been assigned, delaying for a period of time without scheduling said task.

13. The method of claim 12, further comprising, if a task to which primary priority has been assigned becomes available for scheduling during the period of time, scheduling the task to which primary priority has been assigned in preference to the task to which primary priority has not been assigned.

14. The method of claim 12, wherein the period of time is adaptive in dependence on the amount of memory available to the ray tracing system for storage of intermediate data relating to tasks present in the ray tracing system.

15. The method of claim 1, further comprising:

providing a first queue for tasks to which primary priority has been assigned and a second queue for tasks to which primary priority has not been assigned; and scheduling tasks for processing from the second queue only when no tasks are present in the first queue.

16. The method of claim 1, wherein each task comprises a plurality of instances of a shader program corresponding to a respective plurality of rays for which the shader program is to be executed.

17. A ray tracing system configured to process rays, wherein:

the ray tracing system comprises task scheduling logic and processing logic, the ray tracing system being configured to: assign primary priority to a first parent task;

process the first parent task so as to emit a child ray;

process a second parent task to which primary priority has not been assigned so as to emit at least one child ray;

gather child rays into a child task, wherein gathering child rays into the child task comprises gathering, into the child task:

one or more child rays emitted by the first parent task to which primary priority has been assigned; and one or more child rays emitted by the second parent task to which primary priority has not been assigned;

assign primary priority to the child task on the basis that one or more child rays of the child task are derived from the first parent task to which primary priority has been assigned;

determine whether to allocate a flag to any of the child rays of the child task, wherein a flag is allocated to each of one or more child rays of the child task on the basis that they are derived from the second parent task to which primary priority has not been assigned, and wherein the flag allocated to each of said one or more child rays of the child task is for subsequent use in determining whether to assign a secondary priority to one or more grandchild tasks into which one or more grandchild rays derived from the child task are gathered; and schedule the child task for processing in preference to one or more other tasks to be scheduled to which primary priority has not been assigned.

18. A non-transitory computer readable storage medium having stored thereon computer readable instructions that, when executed at a computer system, cause the computer system to perform a method of scheduling processing in a ray tracing system, the method comprising:

assigning primary priority to a first parent task;

processing the first parent task so as to emit at least one child ray;

processing a second parent task to which primary priority has not been assigned so as to emit at least one child ray;

gathering child rays into a child task, wherein said gathering comprises gathering, into the child task:

one or more child rays emitted by the first parent task to which primary priority has been assigned; and one or more child rays emitted by the second parent task to which primary priority has not been assigned;

assigning primary priority to the child task on the basis that one or more child rays of the child task are derived from the first parent task to which primary priority has been assigned;

determining whether to allocate a flag to any of the child rays of the child task, wherein a flag is allocated to each of one or more child rays of the child task on the basis that they are derived from the second parent task to which primary priority has not been assigned, wherein the flag allocated to each of said one or more child rays of the child task is for subsequent use in determining whether to assign a secondary priority to one or more grandchild tasks into which one or more grandchild rays derived from the child task are gathered; and scheduling the child task for processing in preference to one or more other tasks to be scheduled to which primary priority has not been assigned.

* * * * *